US009658848B2

(12) United States Patent
Bragg, Jr. et al.

(10) Patent No.: US 9,658,848 B2
(45) Date of Patent: May 23, 2017

(54) STORED PROCEDURE DEVELOPMENT AND DEPLOYMENT

(71) Applicant: Bank of America Corporation, Charlotte, NC (US)

(72) Inventors: Raymond B. Bragg, Jr., Jacksonville Beach, FL (US); William H. Muldoon, Newtown, PA (US); Ronald A. Sanderson, New Hope, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/724,856

(22) Filed: May 29, 2015

(65) Prior Publication Data
US 2016/0350107 A1 Dec. 1, 2016

(51) Int. Cl.
G06F 7/06 (2006.01)
G06F 11/36 (2006.01)
G06F 9/44 (2006.01)
H04L 29/08 (2006.01)

(52) U.S. Cl.
CPC .............. G06F 8/71 (2013.01); H04L 67/10 (2013.01)

(58) Field of Classification Search
CPC ..................... G60F 8/71; H04L 67/10
See application file for complete search history.

(56) References Cited

U.S. PATENT DOCUMENTS

| 6,457,170 | B1* | 9/2002 | Boehm | G06F 8/71 |
| | | | | 717/106 |
| 2002/0116702 | A1* | 8/2002 | Aptus | G06F 8/20 |
| | | | | 717/170 |
| 2005/0246687 | A1* | 11/2005 | Scott | G06F 8/71 |
| | | | | 717/122 |
| 2011/0055799 | A1* | 3/2011 | Kaulgud | G06F 11/3616 |
| | | | | 717/101 |

(Continued)

OTHER PUBLICATIONS

Ratschiller, Web Application Development with PHP 4.0, Jul. 12, 2000, pp. 137-148.*

(Continued)

Primary Examiner — Albert Phillips, III
(74) Attorney, Agent, or Firm — Banner & Witcoff, Ltd.; Michael A. Springs

(57) ABSTRACT

Methods, systems, and computer-readable media for developing, storing, validating, tracking and transferring stored procedures are presented. The stored procedures may be stored in a central storage location. The storage location may receive a first version of a stored procedure and generate a change identifier for the first version. The system may evaluate the stored procedure to determine whether it complies with standards of the entity. In some examples, the first version may be checked-out and transferred to another environment for, for instance, modification to create a second version. The second version may then be transmitted to the central storage location for storage. A second change identifier may be generated and associate with the second version. The second version and the second change identifier (Continued)

may be stored. Similarly, an unlimited number of modifications to the stored procedure, each associated with a unique change identifier from the storage system, may be made.

19 Claims, 10 Drawing Sheets

(56) References Cited

U.S. PATENT DOCUMENTS

| | | | | |
|---|---|---|---|---|
| 2013/0185701 | A1* | 7/2013 | Martick | G06F 8/71 717/120 |
| 2013/0340076 | A1* | 12/2013 | Cecchetti | G06F 21/55 726/23 |
| 2014/0196010 | A1* | 7/2014 | Balachandran | G06F 8/71 717/124 |

OTHER PUBLICATIONS

Horvat How to Version SQL Server Database Schema, 2014, pp. 1-17.*
Nilesh, Database Versioning: The ignored aspect of version control, 2014, pp. 1-2.*
Thomson, Enforcing naming conventions using database unit testing, 2010, pp. 1-4.*
Margalit the Definitive Guide to Database Version Control, 2014, pp. 1-10.*
Cook, Version Control in SQL Server 2007, pp. 1-6.*
IEEE 100: The Authoritative Dictionary of IEEE Standard Terms 7th Ed., 2000, pp. 916-917.*

* cited by examiner

STORED PROCEDURE DEVELOPMENT AND DEPLOYMENT

BACKGROUND

Aspects of the disclosure relate to computer hardware and software. In particular, one or more aspects of the disclosure generally relate to computer hardware and software for developing, validating and tracking stored procedures.

Large entities often have several different development teams working in various different business divisions, groups, units, or the like. Because these development teams are often part of different divisions or groups within the entity, they often perform their work independently of other development teams and, accordingly, it is difficult for an entity to implement and/or enforce any standards for these teams. For instance, each development team may store any stored procedures created in a system particular to that team and/or may use a naming convention for stored procedures particular to that team. In arrangements such as this, it is often difficult to track progress of stored procedures, understand a location of a stored procedure, and/or distinguish between different versions of stored procedures.

SUMMARY

Aspects of the disclosure relate to various systems and arrangements for developing, storing, validating and tracking stored procedures. In some arrangements, the stored procedures may be stored in a central storage location. For instance, in some examples, all stored procedures for an entity may be stored in a single, integrated storage location. When the storage location receives a first version of a stored procedure, the system may generate a change identifier for the first version of the stored procedure and may associate the change identifier with the first version of the stored procedure. The system may then evaluate the stored procedure to determine whether the stored procedure complies with standards determined by the entity. If so, the stored procedure and associate change identifier will be stored by the system (e.g., the central storage location). If not, a notification may be transmitted to a user indicating that the stored procedure is not in compliance with entity standards.

In some examples, the first version of the stored procedure may be checked-out and transferred to another device, environment, or the like, such as a testing environment, production environment, or the like. The first version of the stored procedure may be modified to create a second version, which may then be transmitted back to the central storage location for storage. Upon receipt of the second version of the stored procedure, the system may generate a second change identifier and associate that change identifier with the second version of the stored procedure. The second version of the stored procedure and the second change identifier may then be stored. In a similar manner, an unlimited number of subsequent versions of the stored procedure may be created, transmitted, stored, validated, and transferred to any number of environments.

In some arrangements, the stored procedure and/or versions thereof, may be tracked. For instance, modifications made to one or more versions of the stored procedure may be recorded. Further, a status, location, or the like, of the stored procedure (or version of the stored procedure) may be tracked. This information may be displayed to a user as requested.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

GLOSSARY

Figure 1:
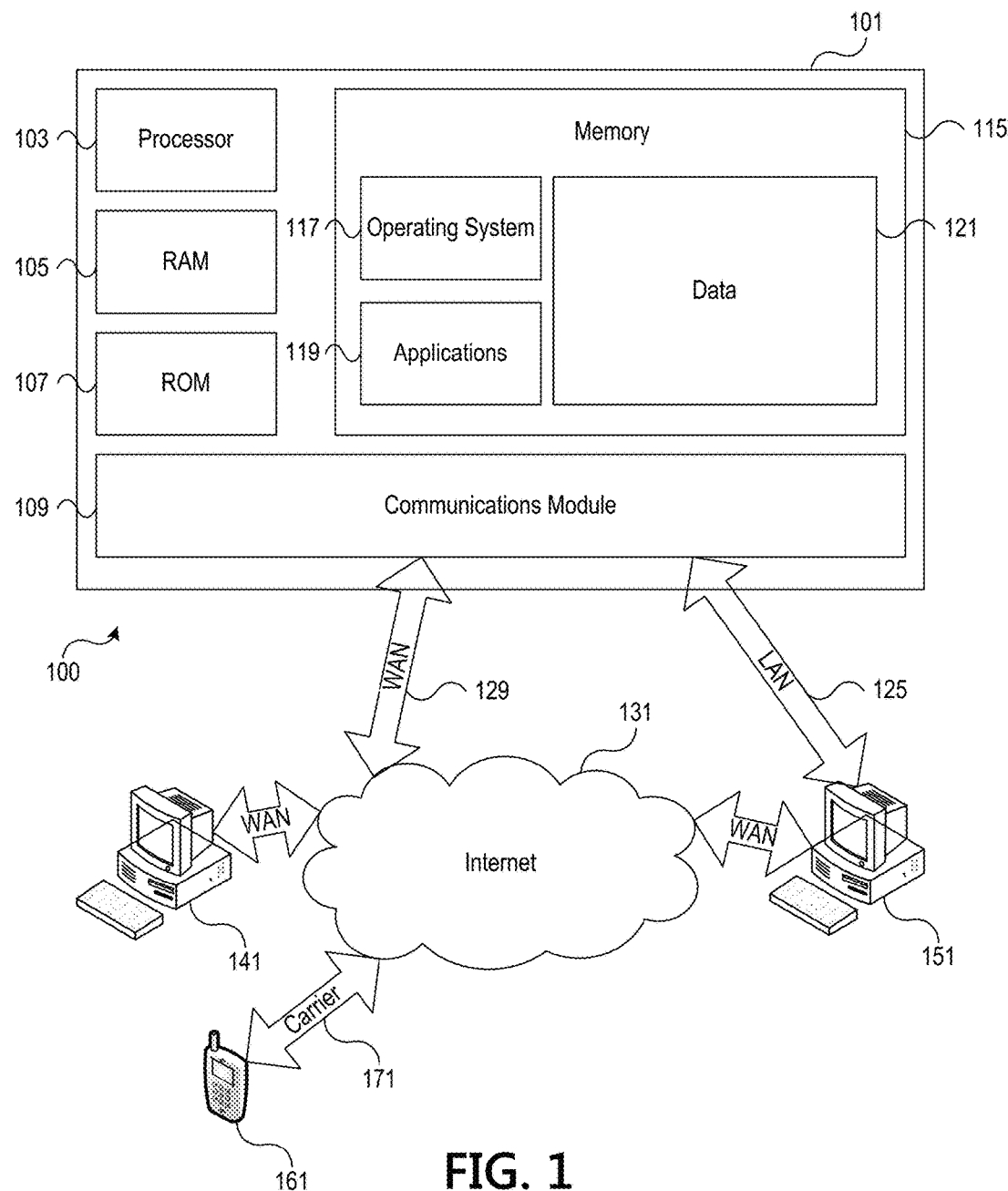
FIG. 1 depicts an illustrative operating environment in which various aspects of the disclosure may be implemented in accordance with one or more example arrangements described herein.

The following glossary provides definitions for several terms used in the disclosure.

A "stored procedure" refers to a user defined database object, including, for instance, database procedures, functions and views. The stored procedure may be used to consolidate and centralize logic that was originally implemented in applications. A stored procedure may be created, tested, modified and/or placed into production. Through some or all of these processes, different versions of a single stored procedure may be created.

A "change identifier" refers to a unique identifier associated with a version of a stored procedure. For example, the change identifier may include numbers, characters, or letters that create a unique identifier for a version of a stored procedure. The change identifier may be a random string of characters, letters, numbers, or the like, or may be sequential.

To "check-out a stored procedure" (or version of a stored procedure) refers to transfer or transmission of the stored procedure (or a version of the stored procedure) from a storage system or device to another system, device or module. For instance, checking out a version of a stored procedure may include transfer of the current version of the stored procedure to one of a testing environment or a production environment, or the like, with an intent to update, modify, edit, or the like, the stored procedure. In some examples, a copy of the current version of the stored procedure is transferred or transmitted such that the current version will also remain in the storage system or device for tracking purposes, comparison purposes, or the like.

To "check-in a stored procedure" (or version of a stored procedure) refers to transfer or transmission of a stored procedure (or a version of the stored procedure) that was previously "checked out" and modified or new from the other system, device or module to the storage system or device. For instance, checking in a version of the stored procedure may include receiving, by the storage device or system, a modified version of the stored procedure and storing that modified version in the storage device or system.

To "associate the change identifier with a version of a stored procedure" refers to assigning the change identifier to the version of the stored procedure such that the change identifier remains with the version of the stored procedure, regardless of location, transfer, transmission, or the like, of the version of the stored procedure.

A "storage system" refers to a system or device that stores multiple objects, each with multiple versions identified by unique change identifiers. An example of a storage system includes, but is not limited to, a source control management system.

An "environment" refers to a system or device that manages database objects, including for example, stored procedures. Examples of environments include relational database management systems.

A "ticketing system" refers to a system or device that manages change requests to any system or environment. Examples of ticketing systems include change management systems.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

FIG. 1 depicts an illustrative operating environment in which various aspects of the present disclosure may be implemented in accordance with one or more example arrangements. Referring to FIG. 1, computing system environment 100 may be used according to one or more illustrative arrangements. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the particular functionality and components of the disclosed arrangements include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
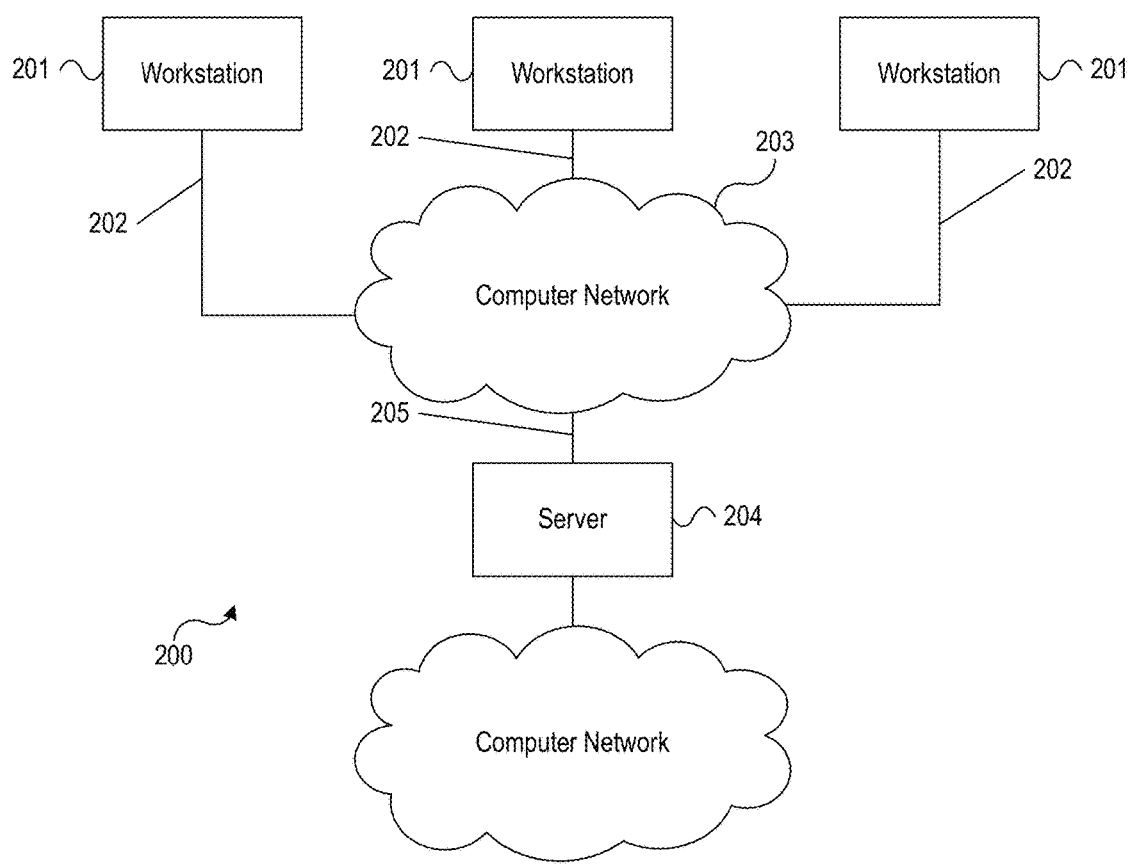
FIG. 2 depicts an illustrative block diagram of workstations and servers that may be used to implement the processes and functions of certain aspects of the present disclosure in accordance with one or more example arrangements described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
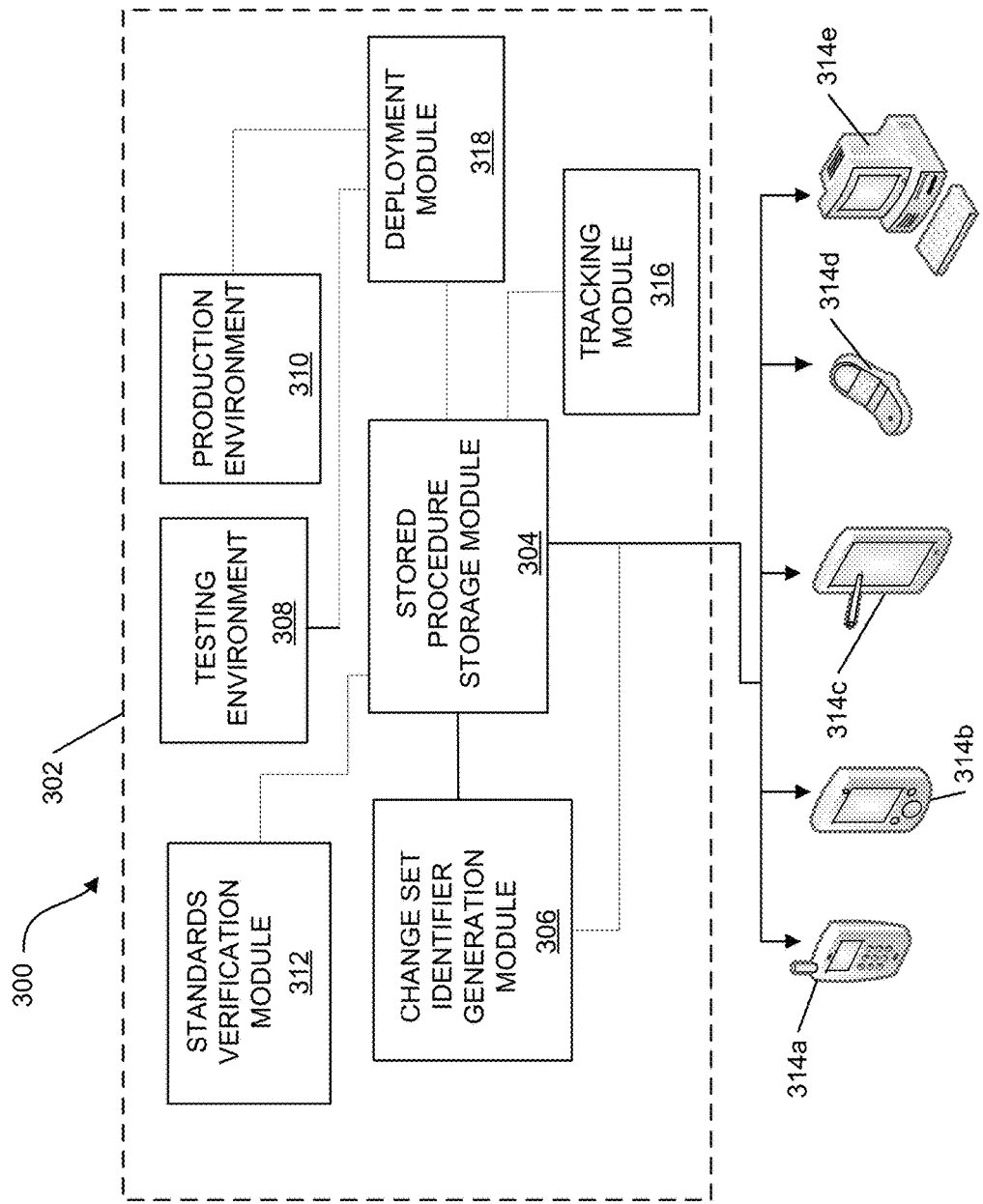
FIG. 3 depicts an illustrative stored procedure development and deployment system in accordance with one or more example arrangements described herein.

FIG. 3 depicts an illustrative stored procedure development and deployment system according to one or more arrangements described herein. In some examples, the stored procedure development and deployment system 300 may be part of, internal to, or associated with an entity 302. The entity 302 may be a corporation, university, government entity, or the like. In some examples, the entity 302 may be a financial institution, such as a bank. Although various aspects of the disclosure may be described in the context of a financial institution, nothing in the disclosure shall be construed as limiting the stored procedure development and deployment system 300 to use within a financial institution. Rather the system may be implemented by various other types of entities.

Further, aspects of the stored procedure development and deployment system 300 may be contained in one or more computing devices, servers, or the like configured to perform the particular functions described herein. For instance, the stored procedure development and deployment system 300 may include one or more modules, devices, systems, or the like, that may be implemented in hardware and/or software (e.g., one or more of the components of computing device 101) configured to perform various functions (e.g., functions particular to the stored procedure development and deployment system 300) within the system 300. One or more modules may be contained within the same physical device or may be housed in separate devices. Further, although one or more modules shown in FIG. 3 are within the entity 302, any of the modules may be located external to the entity 302 but may be associated with the entity 302. For instance, one or more modules may be associated with a personal computing device of a user. Accordingly, various functionality associated with the modules may be performed at the personal computing device, which may be located external the entity 302 but may be associated with the entity by way of a user associated with the device being associated with the entity 302 (e.g., an employee of the entity), the device including or running an application of the entity 302, and the like. Nothing in the disclosure should be viewed as limiting the one or more modules to a same physical location or a location within an entity.

The stored procedure development and deployment system 300 may include a stored procedure storage module 304. The stored procedure storage module 304 may include at least one database and may be configured to store one or more stored procedures. In some examples, the stored procedure module 304 may be configured to store all stored procedures associated with the entity 302. Accordingly, even in arrangements in which different divisions, business units, or the like, are developing and/or storing various stored procedures, all stored procedures may be stored in a single location, such as stored procedure storage module 304. Further, the stored procedure storage module 304 may, in some examples, store all versions of stored procedures, so that all stored procedures may be contained in a single, central storage module.

The stored procedure development and deployment system 300 may further include a change identifier generation module 306. The change identifier generation module 306 may be connected to or in communication with the stored procedure storage module 304 (and/or various other modules within the system 300) and may be configured to generate a change identifier that may be associated with a version of a stored procedure. For instance, when a stored procedure is created and stored in the stored procedure storage module 304, and/or when a stored procedure that has been checked out is checked in to the stored procedure storage module 304, the change identifier generation module 306 will generate a change identifier associated with the version of the stored procedure that has been created, checked in, or the like. That change identifier may then be associated with the current version of the stored procedure and may be stored with the stored procedure such that, when the stored procedure is checked out, the change identifier may be transmitted with the stored procedure to another environment, as will be discussed more fully herein. As indicated above, associating the change identifier with the current version of the stored procedure may include assigning the change identifier to the current version of the stored procedure such that the change identifier is present with the stored procedure (e.g., in the stored procedure storage module 304, in a testing environment 308, in a production environment 310, or the like). Accordingly, the change identifier may be used to track that particular version of the stored procedure, as will be discussed more fully herein.

The stored procedure development and deployment system 300 may further include a standards verification module 312. The standards verification module 312 may include at least a database storing one or more standards determined by the entity. For instance, an entity may determine that each stored procedure must conform to a particular naming convention. Accordingly, upon a stored procedure being created and/or checked in to the stored procedure storage module 304, the change identifier may be generated and assigned and the standards verification module may evaluate the stored procedure (e.g., compare parameters of the stored procedure to parameters of the standards stored in the standards verification module) to ensure or validate that it conforms to any standards determined by the entity (e.g., a naming convention standard). If not, a notification may be transmitted to a user (e.g., to a user computing device such as computing devices 314a-314e). In some examples, failure to comply with the standards of the entity may result in the system rejecting the stored procedure and therefore not storing it until the standards are met. For instance, the user may be required to rename the stored procedure according to the entity standard naming convention in order to store the procedure in the stored procedures storage module 304.

If the standards verification module 312 determines that the stored procedure does conform to the standards of the entity, the standards verification module 312 may transmit instructions to the stored procedure storage module 304 to store the stored procedure, as well as the change identifier associated with that version of the stored procedure.

As mentioned above, the stored procedure development and deployment system 300 may further include other environments in which a stored procedure may be tested, implemented, or the like. For instance, a testing environment 308 may be part of the system and may receive stored procedures that are checked out from the stored procedure storage module 304 to perform one or more tests of the stored procedure. When the stored procedure is transmitted to the testing environment 308 for testing, the change identifier associated with that version of the stored procedure may be transmitted with the stored procedure. Accordingly, a record is made of the version of the stored procedure being transmitted or transferred to the testing environment 308. When a testing phase is completed, a current version of the stored procedure (e.g., a version including any modifications made during the testing phase) may be transmitted to the stored procedure storage module 304 to receive a second, different change identifier associated with this current version of the stored procedure, for standards verification, and/or for storage, as discussed herein.

The stored procedure development and deployment system 300 may further include a production environment 310. Production environment 310 may be part of the system 300 and may receive one or more stored procedures from the stored procedures storage module 304 to be placed in production. That is, the stored procedure may be transmitted from the stored procedures storage module 304 to the production environment 310 when testing of the stored procedure is complete and the stored procedure is ready to be implemented or placed in use within the entity. Transmission or transfer of the stored procedure from the stored procedure storage module 304 to the production environment 310 may include transferring the change identifier associated with that version of the stored procedure along with the stored procedure such that a record of the transfer and version of the stored procedure transferred may be created.

In some examples, the stored procedure development and deployment system 300 may include a deployment module 318. The deployment module 318 may include hardware and/or software configured to perform particular functions within the system 300. For instance, when a stored procedure is requested to be transferred from the stored procedure storage module 304 to the testing environment 308 or production environment 310, the deployment module 318 may pull the stored procedure from the stored procedure storage module 304 and deploy or transfer the stored procedure to the desired environment.

The stored procedure development and deployment system 300 may further include a tracking module 316. The tracking module 316 may include hardware and/or software configured to compare one or more versions of a stored procedure to identify and changes or differences between the versions. That is, the tracking module 316 may compare two or more different versions of the stored procedure (as identified by the change identifier associated with each version) and record any differences between the versions of the stored procedures or differences between the versions of the stored procedures. A record may be kept of the changes and/or differences and, in some instances, the record may include additional information related to a user to made the modifications, a user to whom the version was checked out, or the like. The record may also include the change identifier of each version associated with a change or difference so that the stored procedure may be easily identified and/or retrieved (e.g., the system may permit a user to search by change identifier in order to view a stored procedure).

Additionally or alternatively, the tracking module 316 may track and/or record transfer or movement of a stored procedure (e.g., from the stored procedure storage module 304 to the testing environment 308, from the stored procedure storage module 304 to the production environment 310, or the like). In some examples, a ticket or other report may be generated (e.g, via a ticketing system) to request a transfer of one or more stored procedures from the stored procedure storage module 304 to the testing environment 308 or the production environment 310. The ticket may include information associated with the version of the stored procedure, such as the change identifier, environment to which the stored procedure is being transferred, and the like. The tracking module 316 may, in some examples, re-order the stored procedures in the ticket according to inter dependencies between the stored procedures. The tracking module 316 may store and track this information to have a running report of a location of a particular version of a stored procedure at any given time. Accordingly, a user may request to view a status of a stored procedure (e.g., from one of computing devices 314a-314e) by entering a change identifier of the desired version of the stored procedure and the system may provide the status (e.g., location) of the stored procedure, and/or any other relevant information (e.g., other versions, date and time of transfer, requesting user, or the like).

These and other arrangements will be discussed more fully below.

Figure 4A:
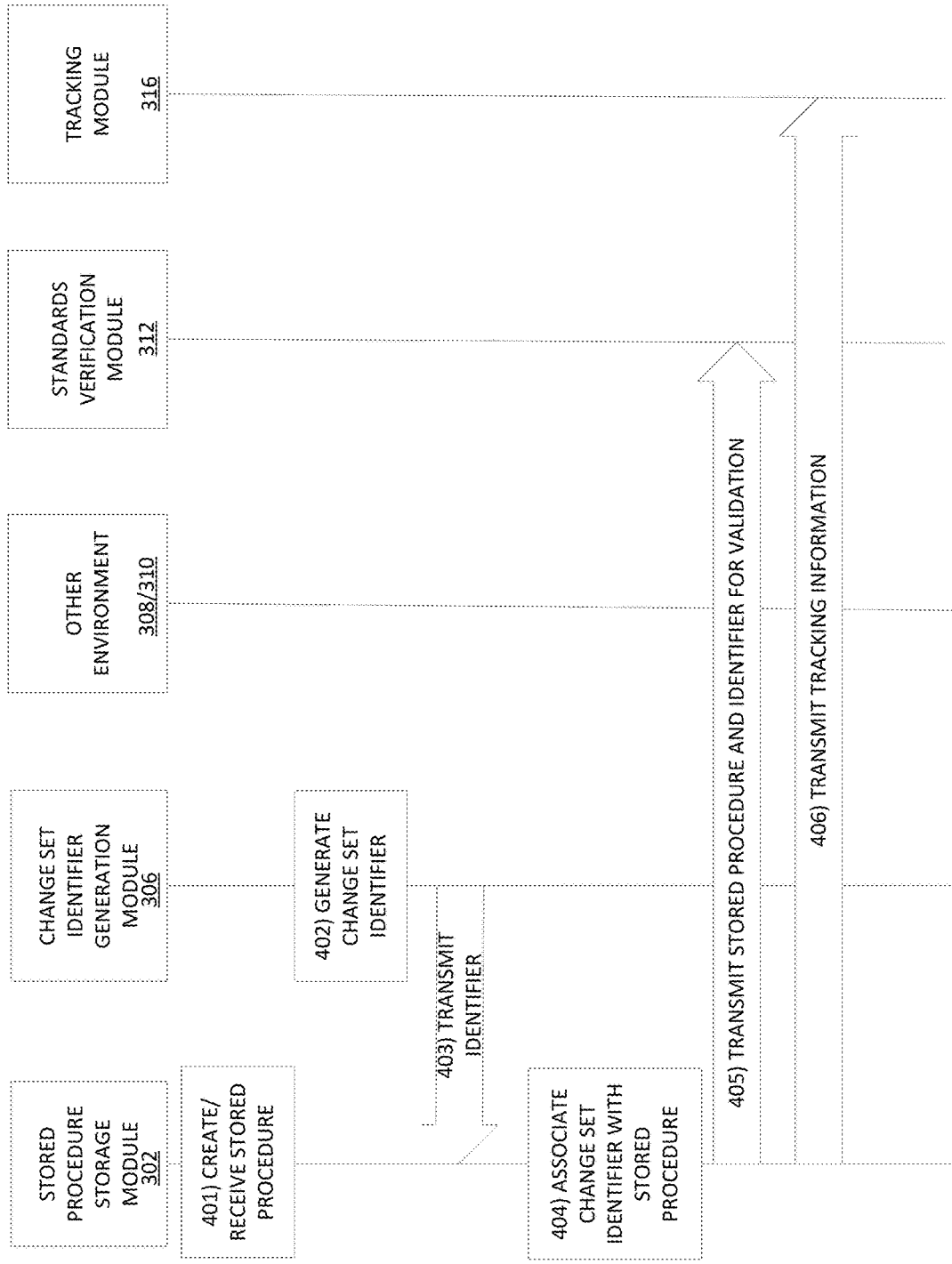
FIGS. 4A-4C depict an illustrative event sequence for storing, validating and tracking stored procedures in accordance with one or more example arrangements described herein.
Figure 4B:
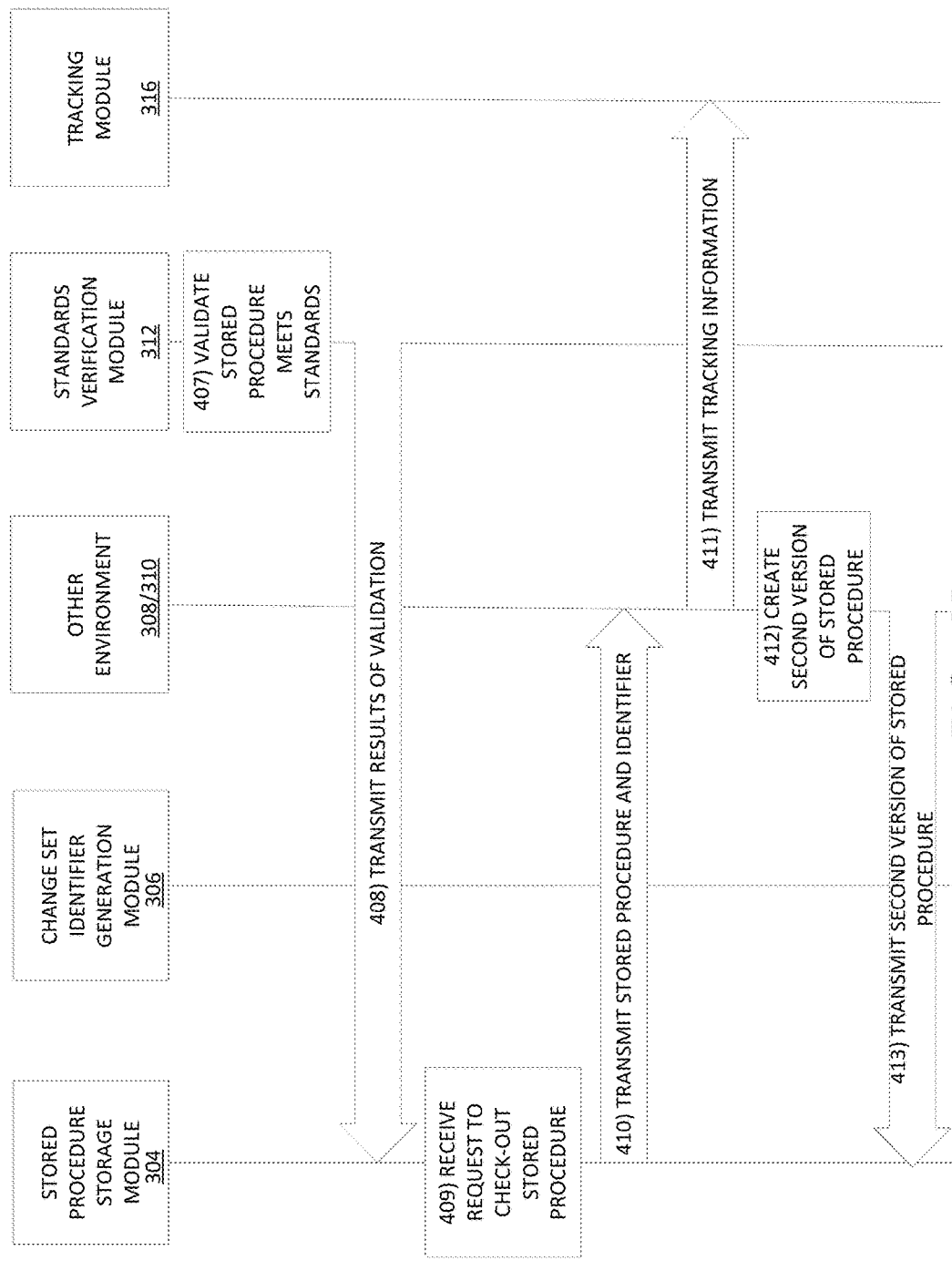
Figure 4C:
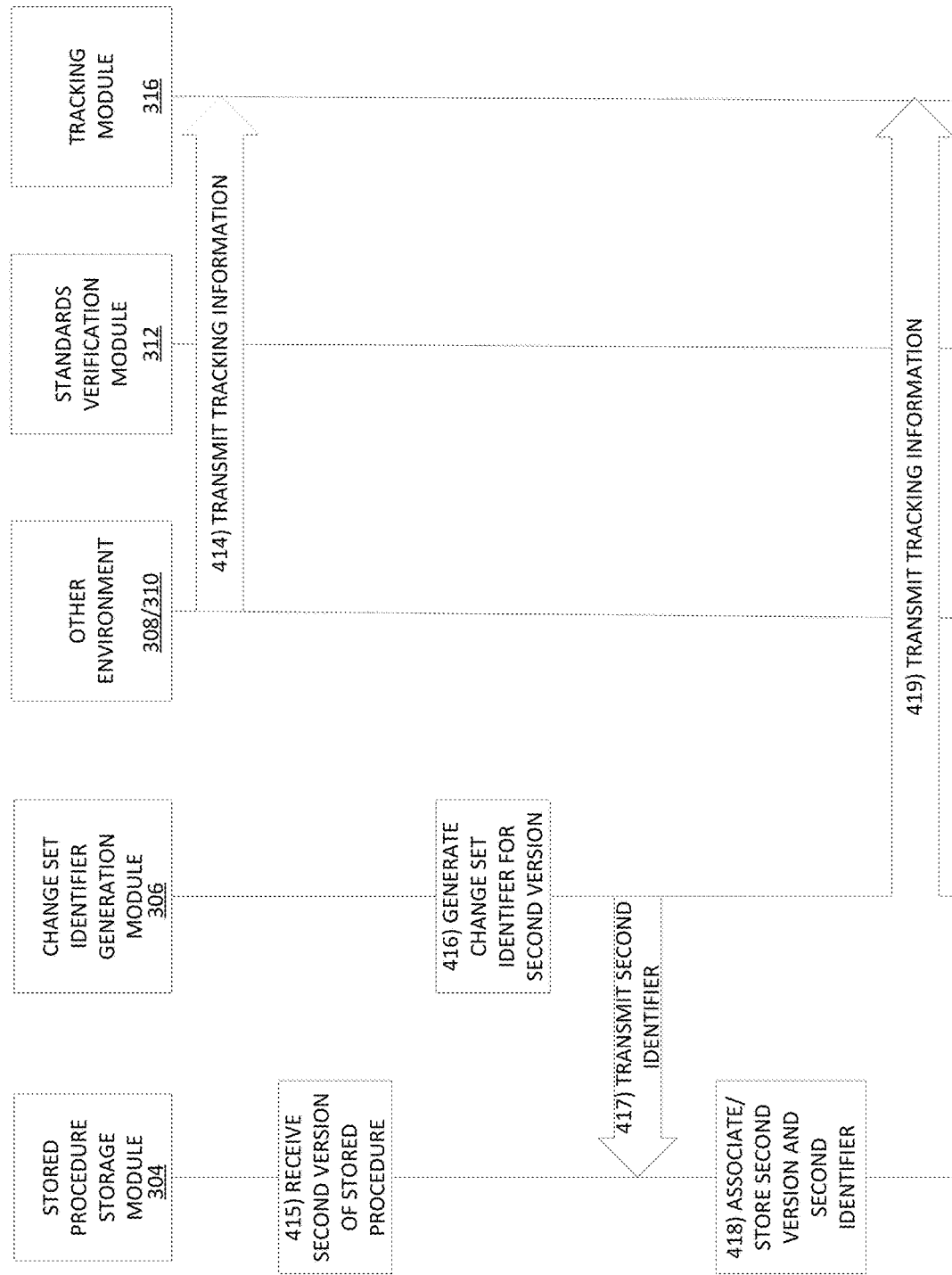

FIGS. 4A-4C illustrate one example event sequence for utilizing the stored procedure development and deployment system 300 in accordance with one or more aspects described herein. The example shown in FIGS. 4A-4C is merely one example sequence and various other steps, processes, or the like, may be included in a sequence without departing from the invention.

With reference to FIG. 4A, in step 401 a first version of a stored procedure is created or received. For instance, a newly created stored procedure may be created in the stored procedure storage module 304 or transmitted to the stored procedure storage module 304. In other examples, the stored procedure may be received, for instance, from another environment (e.g., a testing environment, a production environment, or the like). In step 402, a change identifier is generated for the first version of the stored procedure and in step 403 the change identifier is transmitted to the stored procedure storage module 304. The change identifier may be any number or type of letters, characters, numbers, or the like that provide a tool for identifying a version of a stored procedure. In some examples, the change identifier may be an alphanumeric string that is randomly generated by the change identifier generation module 306. In other examples, the change identifier may be sequentially generated by the change identifier generation module 306, or may be generated based on certain parameters (e.g., the first four digits of the change identifier may represent a year in which the change identifier was generated and the remaining digits may be randomly or sequentially generated). Various combinations of these and other example change identifiers may be used without departing from the invention.

In step 404, the change identifier may be associated with the first version of the stored procedure. That is, the change identifier may be assigned to the first version of the stored procedure and may be transferred with the first version of the stored procedure when the first version of the stored procedure is transferred from the stored procedure storage module 304.

In step 405, the stored procedure and associated change identifier may be transferred to the standards verification module 312 for validation and in step 406, tracking information may be transmitted to the tracking module 316. Tracking information may include a name of the first version of the stored procedure, the change identifier, the time/date it was transferred for validation, and the like.

As discussed above, the standards verification module 306 may, in step 407, evaluate the first version of the stored procedure to determine whether it complies with standards determined by the entity. For instance, the standards verification module 312 may determine whether a name of the first version of the stored procedure complies with naming convention standards determined by the entity. If not, a notification will be transmitted to the user. If so, the first version of the stored procedure and associated change identifier may be stored. The results of the validation may be transmitted to the stored procedure storage module 304 in step 408.

In step 409, a request to check out the first version of the stored procedure may be received. The request may be in the form of a ticket and may include the destination of the first version of the stored procedure, time/date, user requesting, and the like. In step 410, the first version of the stored procedure and the associated change identifier may be transferred or transmitted to another environment, such as a testing environment 308, production environment 310, or the like. In step 411, tracking information associated with the first version of the stored procedure and the transfer information may be transmitted to the tracking module 316. The tracking information may include location or destination to which the first version of the stored procedure was transmitted, change identifier of the first version of the stored procedure, time/date of transfer, user associated with the transfer, and the like. In some examples, some information received by the tracking module 316 may be extracted from the ticket or ticket information.

In step 412, modifications may be made to the first version of the stored procedure (e.g., while in the other environment) and, as such, a second version of the stored procedure may be created. The second version of the stored procedure may then be transferred to the stored procedure storage module 304 in step 413. Tracking information associated with this transfer may be transmitted to the tracking module in step 414.

In step 415, the second version of the stored procedure may be received from the other environment by the stored procedure storage module 304. A second change identifier may be generated by the change identifier generation module 306 in step 416 and, in step 417, the second change identifier may be transmitted to the stored procedure storage module 304. In step 418, the second change identifier may be associated with the second version of the stored procedure and may be stored, by the stored procedure storage module 304, with the stored procedure. In some examples, in storing the second version of the stored procedure and the second change identifier, the first version of the stored procedure and first change identifier will not be overwritten by the new version. Accordingly, each version of a stored procedure, and each change identifier associated with each version, will be stored in the stored procedure storage module 304 so that previous versions of the stored procedure may be reviewed, compared, or the like.

In step 419, tracking information associated with the second version of the stored procedure, second change identifier, and the like may be transmitted to the tracking module 316.

Figure 5:
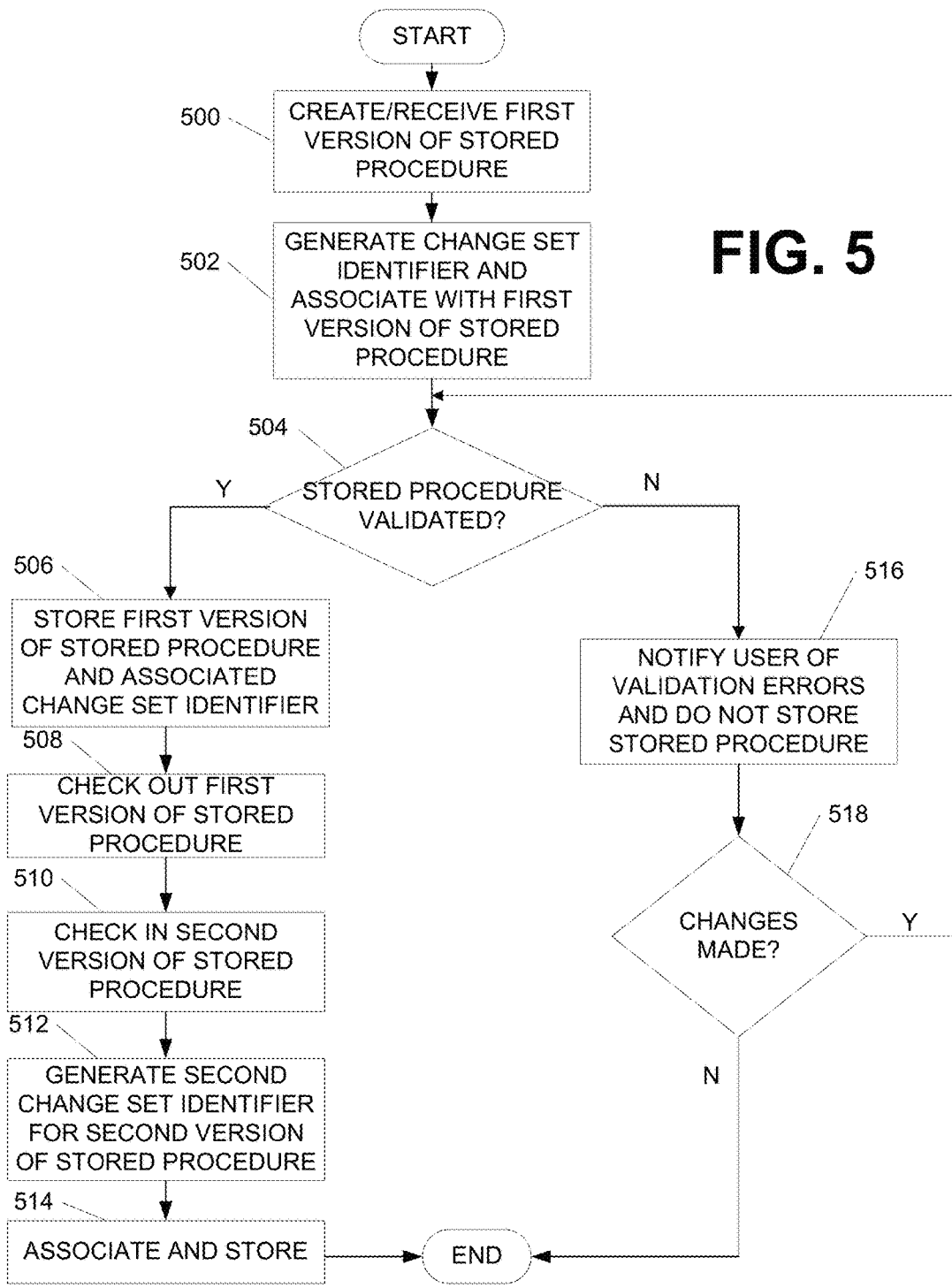
FIG. 5 illustrates one example method of storing and validating a stored procedure according to one or more example arrangements described herein.

FIG. 5 illustrates one example method of implementing the stored procedure development and deployment system according to one or more aspects described herein. In step 500, a first version of a stored procedure is created or received, such as by a stored procedure storage module (304 in FIG. 3). In step 502, a change identifier for the first version of the stored procedure is generated and is associated with the first version of the stored procedure.

In step 504, a determination is made as to whether the first version of the stored procedure meets standards determined by the entity. As discussed above, this may include determining whether a name of the stored procedure complies with a naming standard determined by the entity. If so, the first version of the stored procedure and the associated change identifier may be stored in step 506.

In step 508, the system may receive a request to check-out the first version of the stored procedure (e.g., to transmit or transfer the first version of the stored procedure to another environment) and the first version of the stored procedure may be checked-out. Changes may be made to the first version of the stored procedure and a second version of the stored procedure may be created (e.g., in a testing environment). In step 510, the second version of the stored procedure is returned to the stored procedure storage module to be checked-in and, in step 512, a second change identifier for the second version of the stored procedure is generated. In step 514, the second change identifier may be associated with the second version of the stored procedure and stored with the second version of the stored procedure (e.g., in the stored procedure storage module 304.

Figure 6:
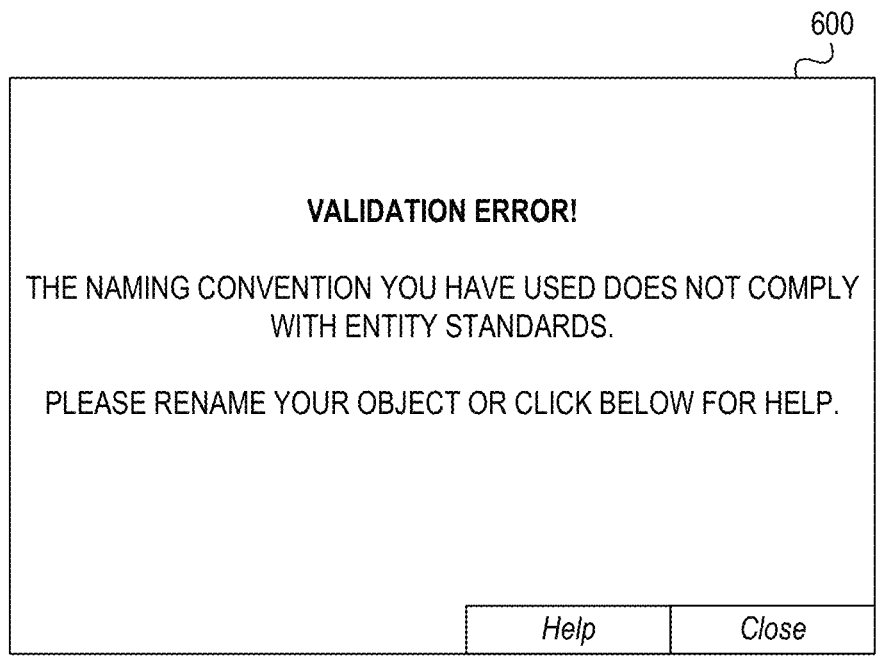
FIG. 6 illustrates one example user interface providing a notification to a user that a stored procedure does not comply with entity standards in accordance with one or more example arrangements described herein.

If, in step 504, the first version of the stored procedure is not validated (e.g., does not comply with entity standards), in step 516, a notification may be transmitted to a user indicating that the first version of the stored procedure does not comply with entity standards. FIG. 6 illustrates one example user interface 600 including such a notification in accordance with one or more aspects described herein. The interface 600 may be displayed on one or more user computing devices (e.g., devices 314a-314e in FIG. 3) and may indicate, for instance, that a name of the stored procedure does not comply with naming convention standards. The user is then instructed to modify the stored procedure. The user may also select a "help" option which may cause a second interface (not shown in FIG. 6) to be displayed which provides guidance and/or examples of the acceptable naming convention.

With further reference to FIG. 5, in step 518, a determination may be made as to whether changes were made to the stored procedure (e.g., in response to the notification). If so, the process may return to step 504 to validate the stored procedure and determine whether the stored procedure is in compliance with entity standards. If not, the process may end.

Figure 7:
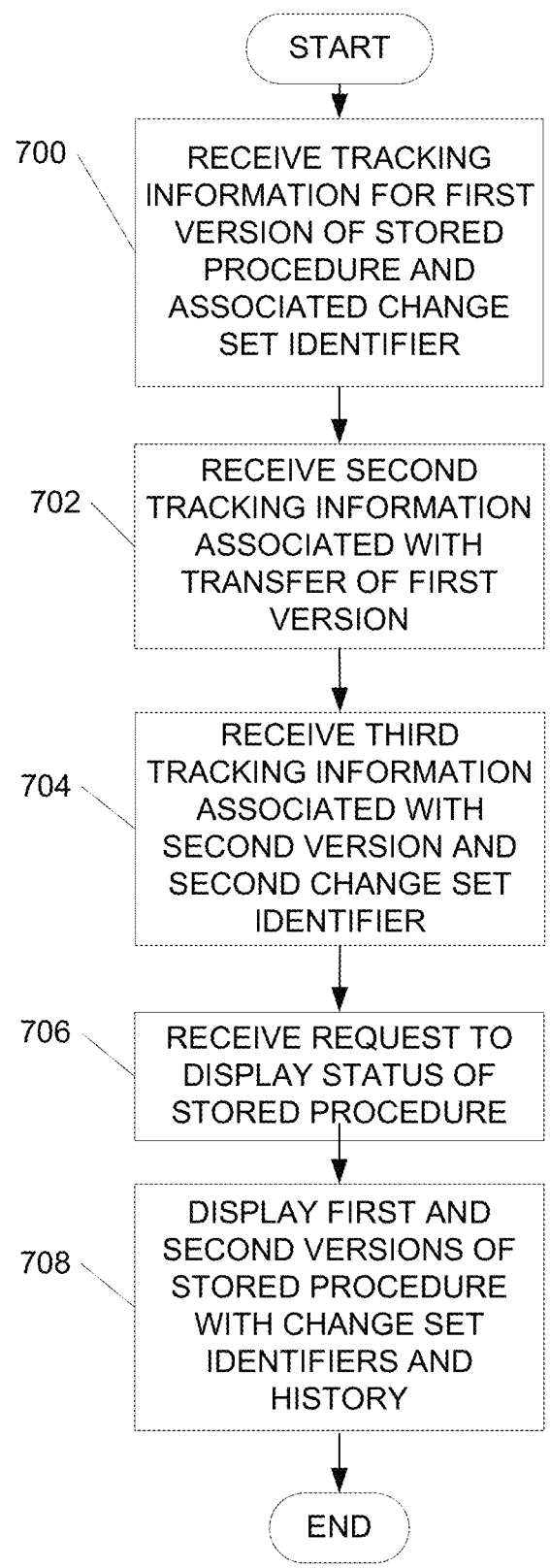
FIG. 7 illustrates one example method of tracking stored procedures according to one or more example arrangements described herein.

FIG. 7 illustrates one example method of tracking stored procedures according to one or more aspects described herein. In step 700, tracking information for a first version of a stored procedure and associated change identifier may be received. The tracking information may include the name of the stored procedure, the change identifier, a date/time the stored procedure was created (or last edited), and the like. In step 702, second tracking information may be received including information associated with a transfer of the first version of the stored procedure to another environment (e.g., a testing environment, a production environment, or the like). The second tracking information may include date/time of the transfer, user requesting transfer, and the like.

In step 704, third tracking information may be received and may include a second version of the stored procedure, as well as the second change identifier associated with the second version. A location of the second version (e.g., checked into stored procedure storage module, in testing environment, or the like) may also be received.

In step 706, a request to display tracking information associated with the stored procedure may be received. In some examples, the request may be received via user input from a computing device. The request may include a change identifier of a version of the stored procedure, a name of the stored procedure, or the like. In step 708, the requested information may be displayed (e.g., via the user computing device). In some examples, a request to view details of a stored procedure may prompt display of all versions of the stored procedure and associated tracking information. Accordingly, the tracking information stored in the tracking module may be stored in one or more data table and may be sorted by name, change identifier, or the like. Different versions of the stored procedure may thus be linked and may be displayed as requested.

Figure 8:
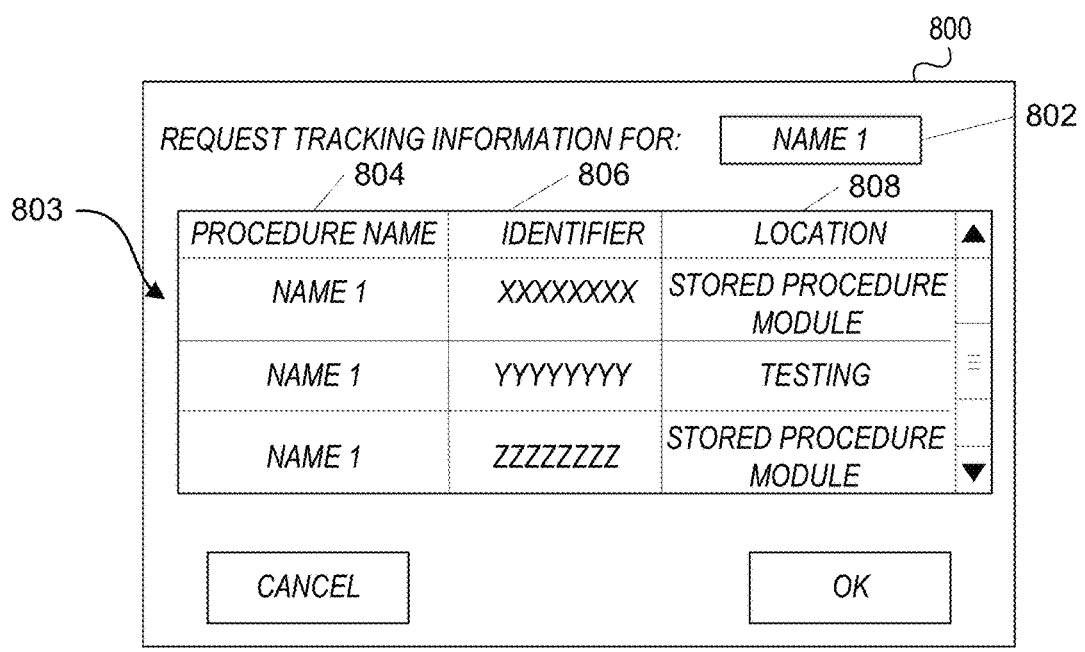
FIG. 8 illustrates one example user interface for displaying tracking information associated with one or more stored procedures in accordance with one or more example arrangements described herein.

FIG. 8 illustrates one example user interface displayed a stored procedure according to one or more aspects described herein. The user interface 800 may be used to review one or more stored procedures and/or tracking or historical data associated with the stored procedures. The interface 800 includes field 802 in which a user may indicate a stored procedure to review. The user may identify the stored procedure by name, change identifier, subject matter, or the like. In some examples, field 802 may include a drop-down list from which a user may select one or more stored procedures to view.

In the example shown in interface 800, field 802 includes a request to view stored procedure "Name 1." Accordingly, the system may display one or more (or all) versions of the stored procedure having that name. As shown, results area 803 displays three versions of the requested stored procedure. Each result shown in region 803 has the same name (e.g., Name 1), shown in column 804, because the results shown are different versions of the same stored procedure. If the results merely identified the stored procedure by name, it would be extremely difficult and time consuming to sort through each version to identify the differences, know which version is the current version, or the like. Accordingly, each version of the stored procedure includes a change identifier shown in column 806. In addition, a current location of each stored procedure is shown in column 808. As shown in interface 800, only the stored procedure with the change identifier YYYYYYY is in the testing environment. The other versions are in the stored procedure storage module. If other versions of the stored procedure are transferred out of the stored procedures storage module, the results may be updated to indicate a new location.

In some examples, selection of a version of the stored procedure from the results area 803 may prompt another interface to be displayed. The additional interface may include additional information associated with that version. For instance, the additional interface may include a summary of changes made in this version or differences between the selected version and one or more other versions (as stored by the tracking module). Additionally or alternatively, information such as time/date created, time/date modified, user who modified, and the like, may be displayed. Various other information may be provided to the user without departing from the invention.

The systems and arrangements described herein provide an efficient system for tracking stored procedures, modifications made to stored procedures, and status of stored procedures. The systems and arrangements discussed herein allow a user to quickly and efficiently distinguish between different versions of a stored procedure and, as desired, view differences between the versions. The arrangements discussed herein provide a system that consolidates all stored procedures in a single location and that distinguishes between different versions of a stored procedure. This may aid in improving the speed at which the system (e.g., one or more computing devices) may create procedures, test procedures and move procedures into production because it greatly reduces the time involved in identifying a current version of a procedure and/or any modifications or differences between two or more versions of the procedure. Further, the arrangements discussed improve the efficiently of implementing new stored procedures in an entity. That is, the systems, methods, and the like, described herein provide functionality on one or more computing devices that permits tracking of objects, assigning change identifiers to objects and distinguishing between multiple versions of the object. This in turn improves on an entity's ability to implement new information technology systems, applications, stored procedures, and the like.

For instance, one example implementation of the systems and arrangements discussed herein is provided below. The example implementation is merely one example and is not intended to limit the disclosure to only the example provided below.

In one arrangement, a first user may create a stored procedure. The stored procedure may be transmitted to a central storage location, such as a stored procedure storage module. When received by the stored procedure storage module, the system (e.g., a change identifier generation module) may generate a change identifier for the current version of the stored procedure. In some examples, the change identifier may be automatically generated by the system upon receiving the stored procedure (or a version of the stored procedure). The change identifier may then be associated with the current version of the stored procedure and stored with the stored procedure. In some examples, a file attribute or property of the stored procedure may be modified to include the change identifier. For instance, if the stored procedure is named "Stored_Procedure_1," the change identifier (e.g., XXXXXXX) may be added to that in storage, such that a listing of stored procedures may then identify this version of the stored procedure as, for instance, "Stored_Procedure_1[XXXXXXX]." This is merely one example of the file attribute or property being modified to include the stored procedure name and change identifier. Various other naming conventions may be used without departing from the invention.

Once the stored procedure has been received and a change identifier associated with the stored procedure, the stored procedure may be evaluated to determine whether the stored procedure complies with standards of the entity. For instance, in continuing the example above, if the standards of the entity require a stored procedure to have a name that includes "stored_procedure_" and a number, (e.g., "stored_procedure_1") then other names of stored procedures will not be permitted by the system. For instance, if a user attempts to stored a procedure with the name "stored-procedure-1," that name will not be permitted and the user will be notified that the stored procedure is not in compliance with entity standards.

If the stored procedure complies with entity standards, the stored procedure and change identifier may be stored in the central storage location. If not, a user creating or attempting to save or store the stored procedure may receive a notification indicating that the stored procedure does not comply with entity standards. The notification may be transmitted to a computing device of the user, such as a desktop computer, laptop computer, smart phone, tablet, or the like.

Once the stored procedure has been saved to the central storage location, a user may request to check-out a version of the stored procedure. For instance, a user may desire to perform testing of the stored procedure, make edits to the stored procedure, or the like. Accordingly, the user may request (e.g., via a ticket) to transfer a version of the stored procedure to another environment (e.g., a testing environment, production environment, or the like). The requested version (and associated change identifier) may be transferred and any desired modifications may be made. The modifications may be tracked or recorded, in some examples, such as by a tracking module. In some examples, the tracking module may compare the first version of the stored procedure (e.g., the version transferred from the central storage location) with the modified version to identify differences between the two versions. These differences may be recorded.

When the user is finished with the stored procedure, he or she may desire to save it (e.g., in the central storage location). Accordingly, the modified version of the stored procedure may be transferred to the central storage location and a different change identifier may be generated for the modified version. The different change identifier may be associated with the modified version and the modified version may be stored, together with the different change identifier.

The arrangements discussed herein allow for efficient and effective tracking of various different versions of a stored procedure. Further, the system integrates stored procedures that are stored in multiple different locations into a central storage location which will allow the system to efficiently and effectively determine whether the stored procedure complies with standards determined by the entity.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the systems, modules, devices, or the like, above may be combined into a single device, and the various functions of each module, device, system, or the like, may be performed by the single device. In such arrangements, any and/or all of the above-discussed communications between modules, devices, systems, environments, or the like, may correspond to data being accessed, moved, modified, updated, and/or otherwise used by the single device. Additionally or alternatively, one or more of the modules, systems, devices, or the like, discussed above may be implemented in one or more virtual machines that are provided by one or more physical computing devices. In such arrangements, the various functions of each system, module, device, or the like, may be performed by the one or more virtual machines, and any and/or all of the above-discussed communications between systems, modules, devices, or the like, may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
a first computing device having a first processor, a first communication interface, and a first memory storing computer-readable instructions that, when executed by the first processor, cause the first processor to:
receive a first version of a stored procedure, the stored procedure including at least one of: a database procedure, a database function, and a database view;
generate a first change identifier for the first version of the stored procedure, the first change identifier including a random string of characters;
associate the first change identifier with the first version of the stored procedure;
evaluate the first version of the stored procedure to determine whether the first version of the stored procedure complies with standards determined by an entity, evaluating the first version of the stored procedure including comparing parameters of the first version of the stored procedure to stored naming convention standards determined by the entity;
determining that the first version of the stored procedure does not comply with the naming convention standards determined by the entity, and rejecting the stored procedure including not storing the stored procedure, generating a notification to a user indicating that the first version of the stored procedure does not comply with the naming convention standards of the entity and requesting a change to the first version of the stored procedure to comply with standards of the entity;
receive, from a second computing device, a request to transfer the first version of the stored procedure to the second computing device; and
the second computing device having a second processor, a second communication interface, and a second memory storing computer-executable instructions that, when executed by the second processor, cause the second processor to:
receive, from the first computing device and via the second communication interface, the first version of the stored procedure and the first change identifier;
modify the first version of the stored procedure to create a second version of the stored procedure;
transmit the second version of the stored procedure to the first computing device for storage.

2. The system of claim 1, the first computing device further including instructions that, when executed, cause the first processor to:
receive, from the second computing device and via the first communication interface, the second version of the stored procedure;
responsive to receiving the second version of the stored procedure from the second computing device, generate a second change identifier for the second version of the stored procedure, the second change identifier being different from the first change identifier and the second change identifier including a random string of characters;
associate the second change identifier with the second version of the stored procedure; and
store the second version and the second change identifier together by the first computing device.

3. The system of claim 2, wherein the second computing device includes at least one of: a testing environment and a production environment.

4. The system of claim 1, further including instructions that, when executed, cause the processor to:
track the first version of the stored procedure and the second version of the stored procedure based on the first change identifier and second change identifier.

5. The system of claim 4, wherein tracking the first version of the stored procedure and the second version of the stored procedure includes recording differences between the first version of the stored procedure and the second version of the stored procedure.

6. The system of claim 1, wherein storing the first version of the stored procedure together with the first change identifier by the first computing device includes modifying a file attribute of the first version of the stored procedure to include the first change identifier.

7. A system, comprising:
a processor;
a communication interface communicatively coupled to the processor; and
memory storing computer-readable instructions that, when executed by the processor, cause the processor to:
receive a first version of a stored procedure, the stored procedure including at least one of: a database procedure, a database function, and a database view;
generate a first change identifier for the first version of the stored procedure, the first change identifier including a random string of characters;
associate the first change identifier with the first version of the stored procedure;
evaluate the first version of the stored procedure to determine whether the first version of the stored procedure complies with standards determined by an entity, evaluating the first version of the stored procedure including comparing parameters of the first version of the stored procedure to stored naming convention standards determined by the entity;
determining that the first version of the stored procedure does not comply with the naming convention standards determined by the entity, and rejecting the stored procedure including not storing the stored procedure, generating a notification to a user indicating that the first version of the stored procedure does not comply with standards of the entity and requesting a change to the first version of the stored procedure to comply with standards of the entity.

8. The system of claim 7, further including instructions that, when executed by the processor, cause the processor to:
receive a request to transfer the first version of the stored procedure to at least one of: a testing environment and a production environment;
check-out the first version of the stored procedure from the storage system and transfer the first version of the stored procedure to the at least one of: the testing environment and the production environment;
receive, by the storage system, a second version of the stored procedure to be checked-in to the storage system, the second version including modifications made to the first version of the stored procedure;

responsive to receiving the second version of the stored procedure, generate a second change identifier for the second version of the stored procedure;

associate the second change identifier with the second version of the stored procedure; and store the second version of the stored procedure with the second change identifier in the storage system.

9. The system of claim 8, wherein transferring the first version of the stored procedure includes transferring the first change identifier with the first version of the stored procedure to the at least one of: the testing environment and the production environment.

10. The system of claim 8, further including instructions that, when executed, cause the processor to:

track the first version of the stored procedure and the second version of the stored procedure based on the first change identifier and second change identifier.

11. The system of claim 10, wherein tracking the first version of the stored procedure and the second version of the stored procedure includes recording differences between the first version of the stored procedure and the second version of the stored procedure.

12. The system of claim 7, wherein storing the first version of the stored procedure together with the first change identifier in the storage system includes modifying a file attribute of the first version of the stored procedure to include the first change identifier.

13. The system of claim 7, further including instructions that, when executed, cause the processor to:

track the first version of the stored procedure using the first change identifier.

14. The system of claim 13, wherein tracking the first version of the stored procedure includes receiving tracking information about the first version of the stored procedure.

15. One or more non-transitory computer-readable media storing instructions that, when executed by a stored procedure development and deployment system comprising at least one processor, memory, and a communication interface, cause the stored procedure development and deployment system to:

receive a first version of a stored procedure, the stored procedure including at least one of: a database procedure, a database function, and a database view;

generate a first change identifier for the first version of the stored procedure, the first change identifier including a random string of characters;

associate the first change identifier with the first version of the stored procedure;

evaluate the first version of the stored procedure to determine whether the first version of the stored procedure complies with standards determined by an entity, evaluating the first version of the stored procedure including comparing parameters of the first version of the stored procedure to stored naming convention standards determined by the entity;

determining that the first version of the stored procedure does not comply with the naming convention standards determined by the entity, and rejecting the stored procedure including not storing the stored procedure, generating a notification to a user indicating that the first version of the stored procedure does not comply with standards of the entity and requesting a change to the first version of the stored procedure to comply with standards of the entity.

16. The one or more non-transitory computer-readable media of claim 15, further including instructions that, when executed, cause the stored procedure development and deployment system to:

receive, from a ticketing system, a request to transfer the first version of the stored procedure to at least one of: a testing environment and a production environment;

check-out the first version of the stored procedure from the storage system and transfer the first version of the stored procedure to the at least one of: the testing environment and the production environment;

receive, by the storage system, a second version of the stored procedure to be checked-in to the storage system, the second version including modifications made to the first version of the stored procedure;

responsive to receiving the second version of the stored procedure, generate a second change identifier for the second version of the stored procedure;

associate the second change identifier with the second version of the stored procedure; and store the second version of the stored procedure with the second change identifier in the storage system.

17. The one or more non-transitory computer-readable media of claim 16, wherein transferring the first version of the stored procedure includes transferring the first change identifier with the first version of the stored procedure to the at least one of: the testing environment and the production environment.

18. The one or more non-transitory computer-readable media of claim 16, further including instructions that, when executed, cause the stored procedure development and deployment system to:

track the first version of the stored procedure and the second version of the stored procedure based on the first change identifier and second change identifier.

19. The one or more non-transitory computer-readable media of claim 15, wherein storing the first version of the stored procedure together with the first change identifier in the storage system includes modifying a file attribute of the first version of the stored procedure to include the first change identifier.

* * * * *